Figure 11:
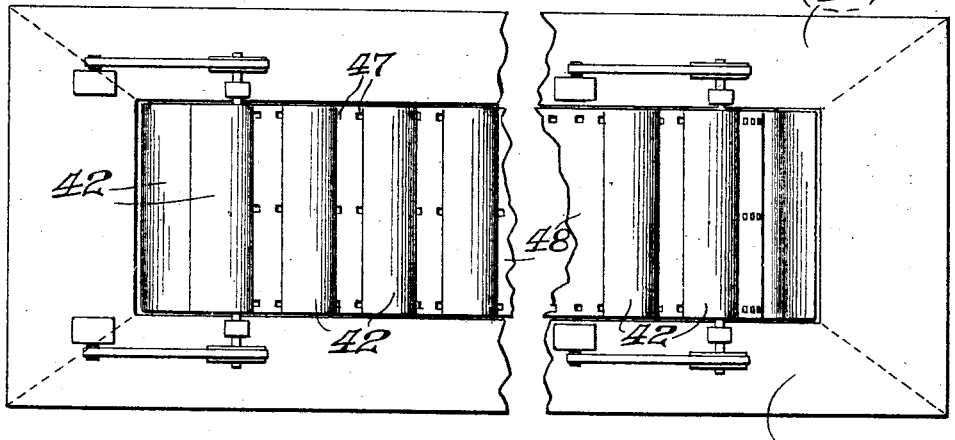

T. WARREN.
CURRENT MOTOR AND TOWING APPARATUS.
APPLICATION FILED JUNE 26, 1909.
968,904.
Patented Aug. 30, 1910.
5 SHEETS—SHEET 1.
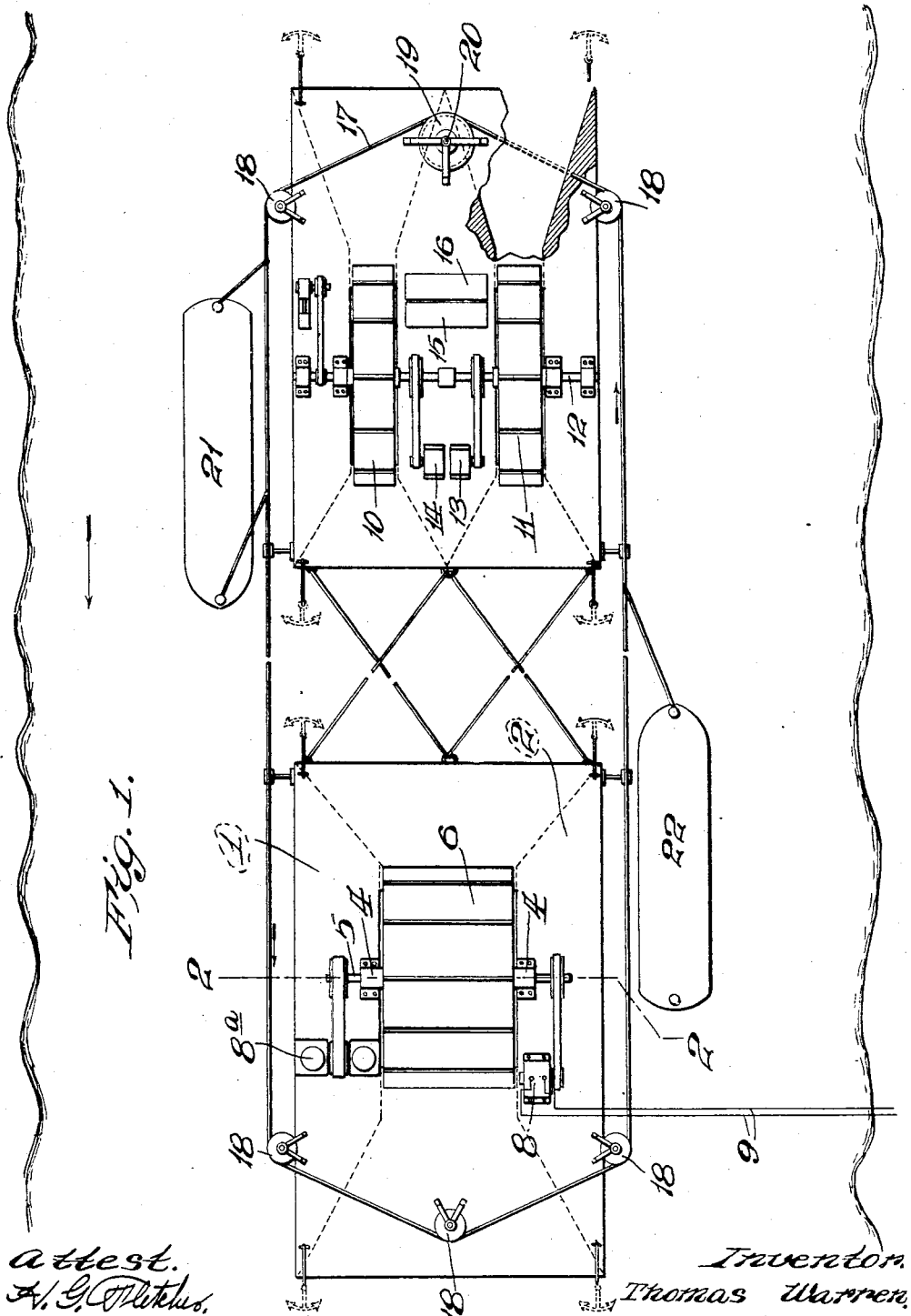

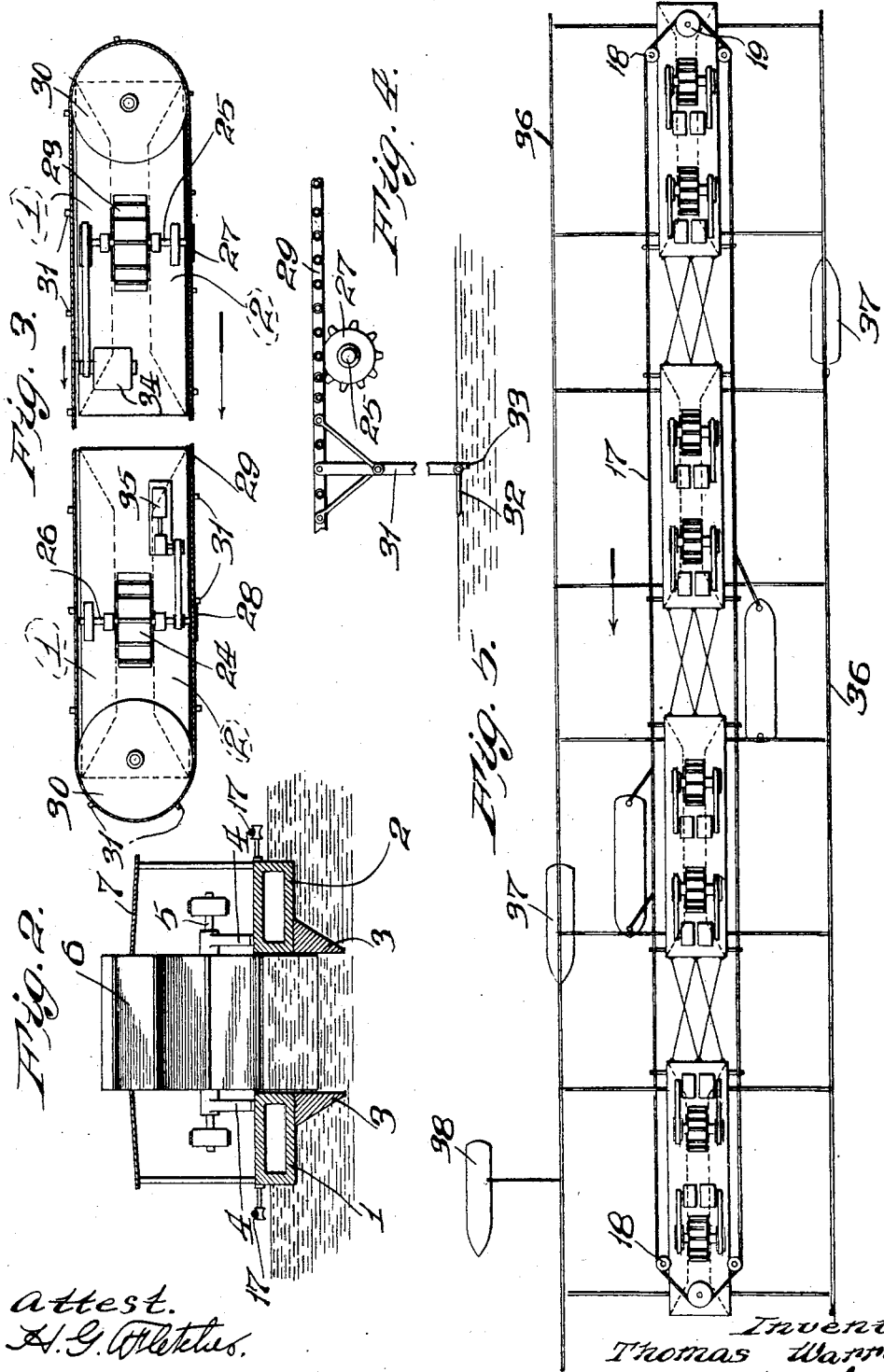

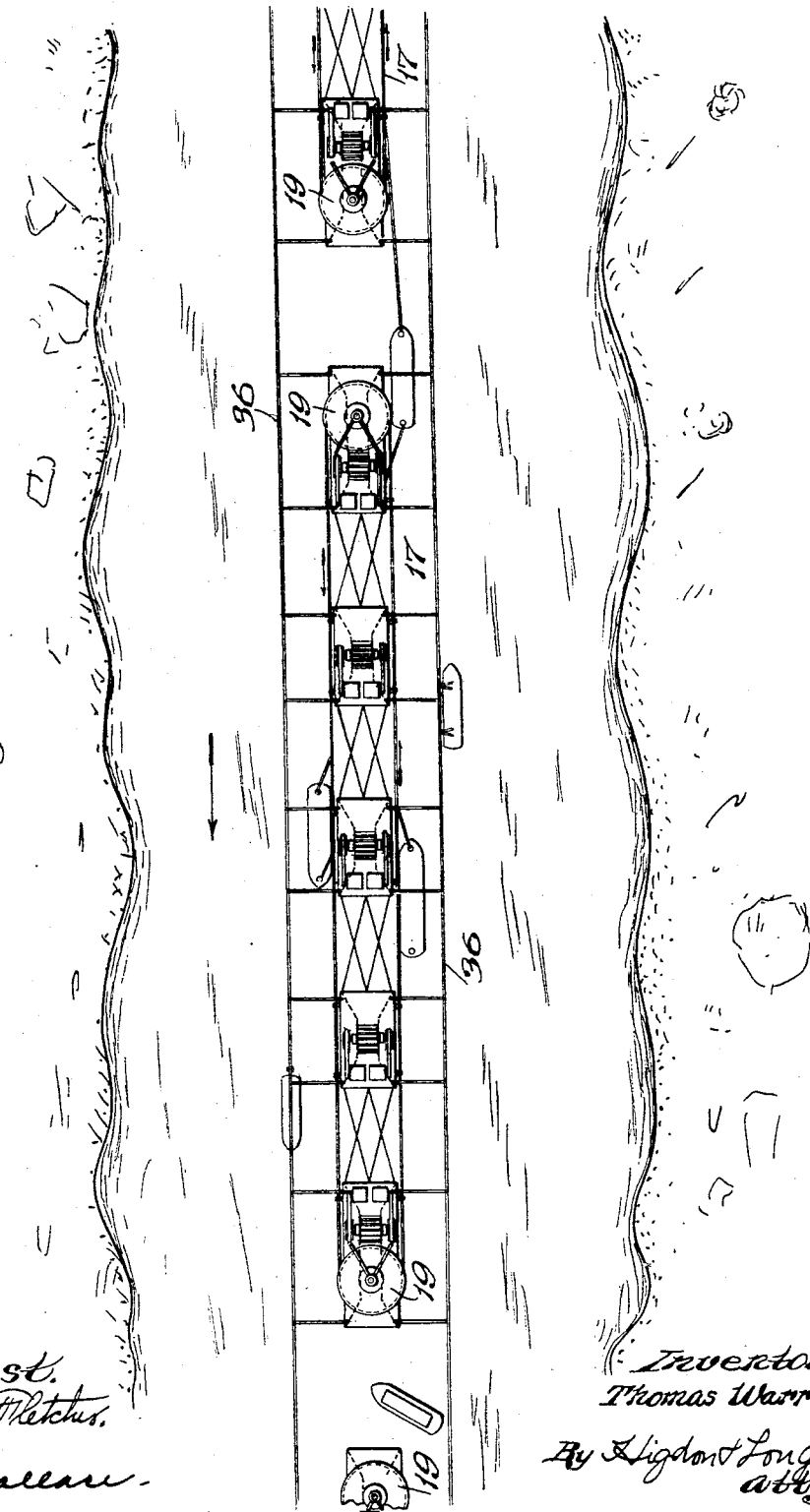

T. WARREN.
CURRENT MOTOR AND TOWING APPARATUS.
APPLICATION FILED JUNE 26, 1909.
968,904.
Patented Aug. 30, 1910.
5 SHEETS—SHEET 4.
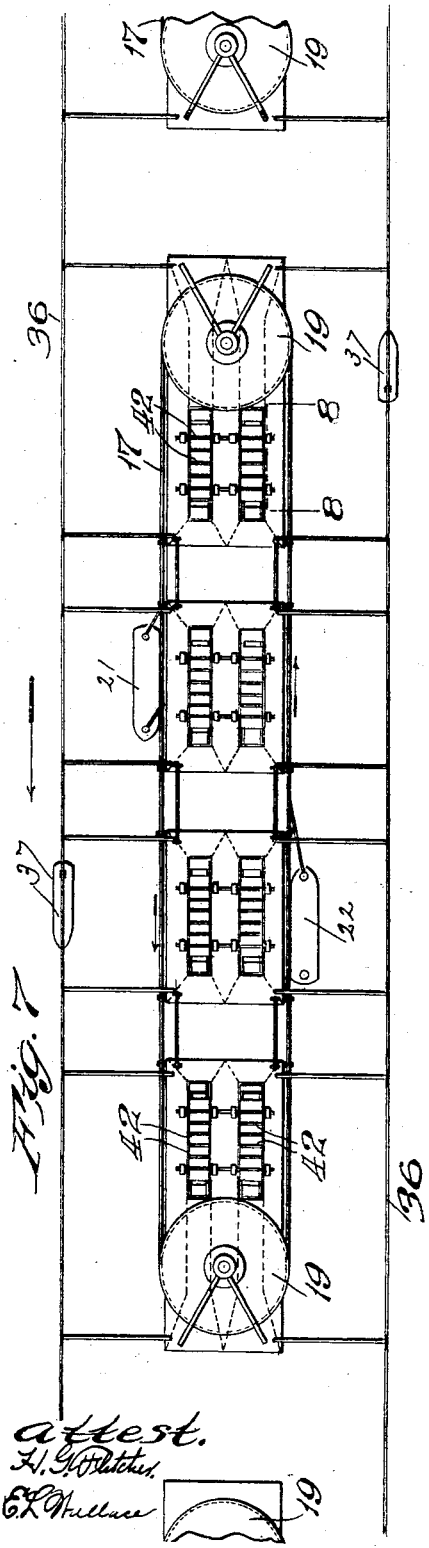
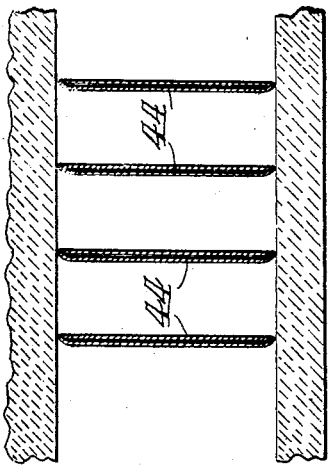
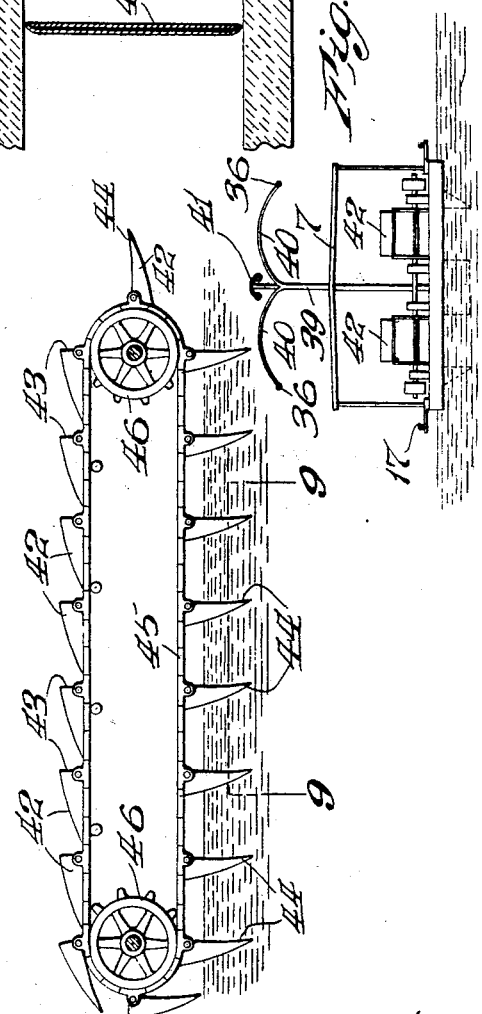

T. WARREN.
CURRENT MOTOR AND TOWING APPARATUS.
APPLICATION FILED JUNE 26, 1909.

968,904.

Patented Aug. 30, 1910.

5 SHEETS—SHEET 5.

Attest.
H. G. Fletcher.
E. L. Wallace.

Inventor.
Thomas Warren.
By Higdon & Longan.
Attys.

UNITED STATES PATENT OFFICE.

THOMAS WARREN, OF ST. LOUIS, MISSOURI.

CURRENT-MOTOR AND TOWING APPARATUS.

968,904.
Specification of Letters Patent.
Patented Aug. 30, 1910.

Application filed June 26, 1909. Serial No. 504,438.

*To all whom it may concern:*

Be it known that I, THOMAS WARREN, a citizen of the United States, and resident of St. Louis, Missouri, have invented certain new and useful Improvements in Current-Motors and Towing Apparatus, of which the following is a specification containing a full, clear, and exact description, reference being had to the accompanying drawings, forming a part hereof.

My invention relates to an apparatus for utilizing the force of water currents to provide power for directing and towing vessels up and down stream, for generating electric or other power for use afloat and ashore, and for other purposes, the object of my invention being to provide a new and improved apparatus, to be positioned in a stream and to be actuated by the current of a stream, whereby vessels moving in the direction of the current are made to utilize the practice of carrying greater tonnage down stream to supply power for directing and towing less heavily laden vessels up stream, without other motive power than that derived from the force of the current, utilized and made effective by my apparatus.

To persons familiar with shipping in navigable streams, it will be readily understood that my apparatus will operate to direct vessels attached to the endless cable moving in a direction with the current without independent directing means on the vessel, and vessels of less tonnage and draft attached to the same endless cable moving in the opposite direction will be towed up stream thereby, the excess tonnage of vessels attached to the cable moving in the direction of the current determining the towing power of the same cable moving in the opposite direction, the movement of the cable about the terminal pulleys being down stream on the one side and up stream on the other, my apparatus utilizing the practice of excess tonnage of vessels bound down stream.

A further object of my invention is, to construct an apparatus to be positioned in a stream to utilize the force of water currents for generating electric or other power which may be utilized in connection with laden vessels bound down stream attached to the apparatus to direct and tow equally or more heavily laden vessels up stream, or the power may be used to actuate terminal pulleys or drums by and about which an endless cable is actuated, to tow and direct vessels up stream with or without vessels being attached to said cable moving in the direction of the current.

A further object of my invention is, to construct an apparatus to be positioned in a stream to utilize the force of water currents for generating electric or other power, with which to supply and operate vessels connecting therewith by trolley or otherwise, and for any other uses, afloat or on shore, to form a means for directing and moving vessels up stream as well as down, and to generate power light and heat by the utilization of the force of the current of a stream alone, with resultant conservation of fuel.

Figure 12:
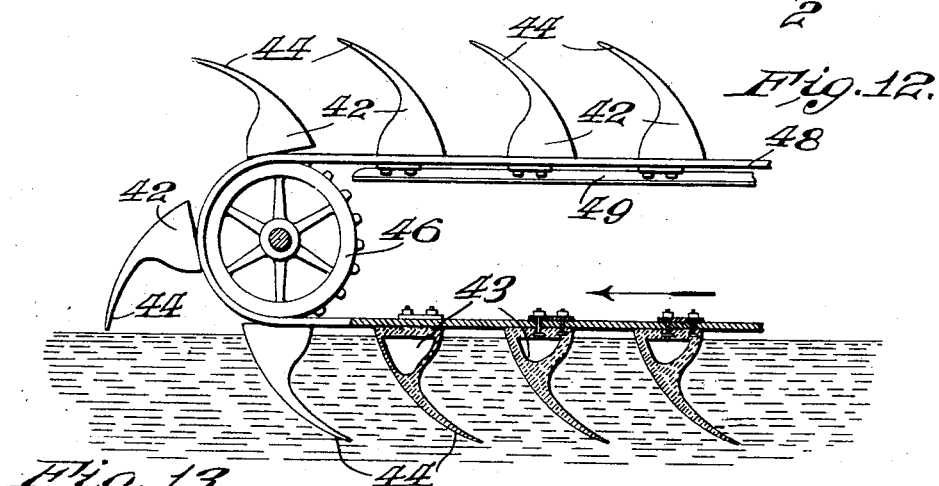
Figure 13:
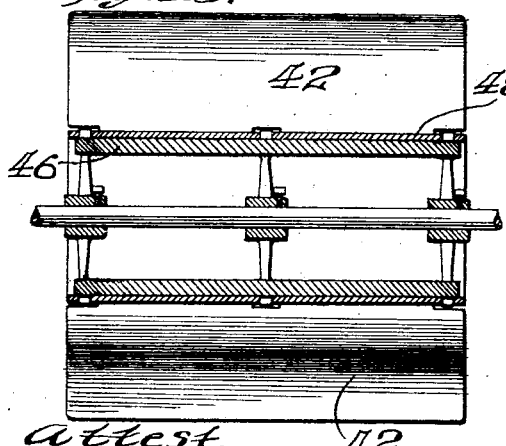
Figure 14:
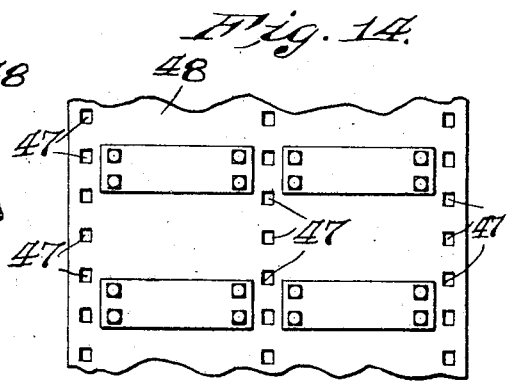

For the above purposes my invention consists in certain novel features of construction and arrangement of parts which will be hereinafter more fully set forth, pointed out in the claims and illustrated in the accompanying drawings, in which:

Figure 1 represents a top plan view of two power units of my improved apparatus positioned and anchored in a stream; Fig. 2 is a section taken on the line 2—2 of Fig. 1; Fig. 3 is a plan view of a modified form of my apparatus; Fig. 4 is a detailed side elevation of one of the sprocket wheels and sprocket chains; Fig. 5 is a plan view of a modified form of my invention; Fig. 6 is a plan view of another modified form of my invention; Fig. 7 is a plan of a further modification of my invention; Fig. 8 is a sectional elevation of the endless chains, paddles and sprocketed wheels or drums shown in Fig. 7 taken on the line 8—8 of Fig. 7; Fig. 9 is a sectional plan taken on the line 9—9 of Fig. 8 and having the float-flume shown in position relative to the paddles; Fig. 10 is an end view of one of the power units showing a modified form of the electric conductors; Fig. 11 is a plan of the end portions of a single float-flume, showing modified form of endless belt and paddles; Fig. 12 is an elevation of the belt, paddles and one of the sprocketed drums shown in Fig. 11, showing a number of paddles in section illustrating the air chambers within the paddles; Fig. 13 is a vertical sectional elevation through the drum, belt and support for the upper section of belt; and Fig. 14 is a plan of a portion of the belt shown in Figs. 11, 12 and 13.

Referring by numerals to the accompanying drawings: in Fig. 1 is illustrated shapes of the float-flumes, a flaring mouth being produced at each end thereof. Each of the said floats has the inner side of each end cut away at an angle, the object being to induce the largest inflow of water into the flume and its prompt exit therefrom after passing the wheel, or water motor, not shown, suspended therein. Being made of reinforced concrete, or other fire-proof material, with water-tight compartments 1 and 2, these float-flumes are practically indestructible and unsinkable. Each of said float-flumes may be so shaped as to form a depending flange or member 3, to confine the water in the flume, to lessen its escape under either float and to prevent lateral pressure of the stream against the water in the flume. Another form of the float-flume, not shown, may be constructed with sides and bottom converging toward a center, forming a funnel shaped conduit, this formation terminating, at a desired point, for fall of the water onto a turbine or other water motor properly placed to be operated thereby.

Mounted on each float-flume are standards 4, provided with suitable bearings to receive a shaft 5, of the water wheel 6. Carried over said float-flume and the superimposed platform or deck and supported in a suitable mechanical manner is a roof 7, designed to protect the machinery, etc., carried by the platform. The water passing through the flume operates the water wheel 6, consequently the shaft 5, on which said water wheel is mounted, operates a dynamo, such as 8, and an air compressor, such as 8ª, either or both of them; and electricity, generated by the dynamo 8, may be distributed over the wire 9 to any point for any purpose, such as furnishing electric power, or light, to be used afloat or on shore.

In Fig. 1 I have shown, anchored in the current, to be operated in conjunction with the apparatus illustrated in Fig. 2, what I term a double float-flume provided with two flumes with two water wheels 10 and 11. These two water wheels 10 and 11 are mounted on a common shaft 12 and operate two dynamos 13 and 14, and the current generated by said dynamos is carried over wires direct to motors, etc., not shown, or stored in storage batteries, such as 15 and 16. I also show in Fig. 1 what I term a single float-flume. This is shown as anchored and suitably held at any desired distance below the first above described power unit, to illustrate that there may be any desirable number of flumes, fixedly placed parallel to each other, in a power unit, each flume having a wheel, or water motor, not shown, operated therein and suitably connected. The water having first acted on the two water wheels 10 and 11, would then pass on and operate water wheel 6, as shown in Fig. 1. In this connection, I may state that it is preferable to have the same number of float-flumes in each unit of each series to avoid diverting or retarding the current. Each series may consist of any desired number of power units, anchored in the current at suitable intervals up and down stream, and encircled by an endless cable 17 mounted upon idlers 18 and adapted to be driven by drum or drums 19, located on the first, or on both the first and last unit of each group, mounted on a motor shaft 20. This motor shaft is operated by means of electricity stored in storage batteries 15 and 16, or the motor may be connected directly with the dynamo, or the drum may be operated by compressed air engine. Attached to said cable are barges or boats 21 and 22, 21 illustrated as going down stream and 22 illustrated as going up stream. The momentum of the barge or boat 21 going down stream may assist in pulling the boat or barge 22 up stream. As barges or boats going down stream can carry much heavier cargoes than can be carried on like barges or boats moving against the current, the greater weight of barge or boat 21, going down stream, attached to the endless cable moving in the direction of the current may, of itself, suffice to drag barge or boat 22, carrying a lighter cargo, attached to the same endless cable moving up stream.

In Fig. 2, 1 and 2 designate two buoyant hollow floats of reinforced concrete, or other suitable construction, with compartments rendered air and water-tight when openings provided in the top of each are suitably closed. Said floats are placed parallel and spaced apart to form flumes, to accommodate the operation of water wheels or motors between them and said floats are properly secured together and form with the superimposed platform or deck and cover over same practically one monolithic structure when completed, which I designate a float-flume.

In Figs. 3 and 4 I have shown a modified form of my apparatus, wherein I show two terminal units of a single float-flume to each unit such as 1 and 2, between which terminal units may be anchored, at suitable intervals in the current, any desired number of similar units properly connected with water wheels, mounted respectively on shafts on each power station or unit. The shafts may carry sprocket wheels 27 and 28; and adapted to be engaged with said sprocket wheels 27 and 28 is an endless sprocket chain 29, mounted on drums or sprocket wheels 30. In this illustration the force of the water is utilized to drive the endless sprocket chain 29. Carried by said endless sprocket chain 29 are depending arms 31, and to each arm is pivoted a paddle 32. Said paddle 32 is hinged and limited in movement in one direction by means of a stop 33. As these paddles 32 go up stream they are not effective to the action of the water, but as they turn on the drum or sprocket wheel and start to go down stream, they do become effective to the action of the water. An endless cable, adapted to be driven by drum 30, may be substituted for the endless sprocket chain 29. The drums in this construction would be placed within the limits of the float-flumes. In conjunction with the water wheel 23, I have also illustrated to be used therewith a dynamo 34, and an air compressor 35 in conjunction with the water wheel 24. Power from these may be used to actuate sprocket wheels or drums 30, and for other uses. Barges and boats may be towed up stream or down stream by attaching to the endless cable 29 on its respective courses.

In Fig. 5 I have shown four units of power generating stations, which may be located any suitable distance apart, up and down stream, and properly anchored, each unit consisting of a float-flume with two water wheels and four dynamos thereon, the current generated by all the stations and all the dynamos being conducted to a trolley line 36, and the current from said trolley line may be used to propel trolley boats or barges, such as 37, up stream or down, or it may be used for charging the storage battery of a float, such as 38, or distributed and utilized for any other purpose. Trolley line 36 may be suspended directly over the floats if desired. This trolley wire may be carried across the open water spaces between each battery of units at such altitude to allow boats to pass to and fro underneath the wire, or may be suitably insulated and extended along or near the bottom of the stream between each battery. I have also shown in connection with this form of apparatus in said Fig. 5 the endless cable 17, which may be used for the purposes heretofore described. It may also be used, in connection with suitable attachments, not shown, to stir up and agitate the bottom of the stream, to deepen and maintain the channel.

In Fig. 6 I have illustrated another grouping of the float-flumes, wherein I show a power battery of five units, each unit having a single float-flume, and spaced apart up stream and down stream from this battery is illustrated a terminal unit of other similar batteries, said batteries being so spaced apart to allow the passage of boats to and fro between them. The first and last unit of each battery has mounted thereon a drum, such as 19, and a cable, such as 17, passing around the said drum which is actuated by an electric motor, compressed air engine, or other energy.

In Figs. 7-8-9 and 10 I have illustrated a grouping of the float-flumes and attachments wherein I show a power battery of four units, each unit having two float-flumes securely anchored in the current, connected by suitable mechanical means and electrically connected by continuous trolley wires 36, carried by suitable poles 39, having laterally projecting arms 40, supporting the feed wires 41 connecting with other similar units, all the power units being encircled by an endless cable 17, to which are attached barges 21 and 22, the power wires 36 and 41 being continued by suitable means across the open water spaces left between the terminal units of this battery and terminal units of other similar batteries up stream and down stream, said batteries being so spaced apart to allow passage of boats between them across the body of water, each power battery being encircled by an endless cable attached to which barges bound down stream may be utilized to draw, up stream, barges less heavily loaded attached to the same cable on its up stream course. The cable may be operated by being suitably passed around the drums on each terminal unit, said drums being actuated by electric motors or other means. In this modified form of my invention, instead of using the paddle wheels as shown in the lower terminal unit in Fig. 1, I employ paddles 42 of reinforced concrete or other suitable material, with a water-tight air chamber top 43 and a suitably shaped depending flange 44, attached to endless chains 45, adapted to be engaged with sprockets on drums 46. These paddles may be hinged and limited in movement in one direction and are effective to the action of the water current as it passes through the float-flume, actuating the drums 46, and the power so produced may be transmitted to and operate a dynamo, such as 8, and an air compressor, such as 8ª, either or both of them; electricity generated by the dynamo 8 may be distributed over the wire 9 to any point for any desired purpose, or uses, or stored in storage batteries, etc.

In the construction shown in Figs. 11, 12, 13 and 14, the paddles 42 are provided with air chambers 43, of somewhat different design from the paddles shown in Fig. 8, and the depending flange is more abruptly reduced near the air chamber and is carried at a greater angle, relative to the chamber, than in the paddle shown in Fig. 8. In this construction I employ drums 46, having sprockets projecting from the face of the drums and arranged to be engaged by the eyes or perforations 47, in the belt 48. To prevent whipping and sagging of the belt I position a suitable support 49, between the drums, over which the belt rides.

The paddles may be of any desired shape and size, and may be attached to the endless belts or chains in any suitable manner, and any suitable provision may be made to cause the sprockets on the drums to engage the belt encircling and actuating said drums.

The utilization of the force of the water may be applied by mechanical means or electrically for the purpose of navigating boats up and down stream, and the power produced may be used to generate various kinds of power for various purposes. Each power battery being self-contained and independent as to its production of energy, at the same time being connected by feed wires with similar batteries above and below, there will be constant production and distribution of electricity throughout the system, even though one or more of the individual batteries might be temporarily inoperative.

The anchorage of the power units may be shifted, as desired, to new positions, the effect being to widen and deepen the channel. This deepening and maintenance of the channel may also be aided by the operation of sand pumps or other suitable appliances operated by the power developed by my apparatus.

I may use single, double, triple, or larger float-flumes in the power units, anchored in the current, with accompanying water wheel or wheels or water motors and other equipment, to form a power unit, and similar units may be stationed at suitable distances apart, up and down stream and properly anchored therein, and when I use a number of such power units, the energy developed by each unit may be used separately or in combination for generating electricity, for compressing air and for other purposes. The power units encircled by the endless cable which is actuated by drums on the terminal units of each series form a power battery. The momentum of a barge or barges attached to the endless cable on its down stream course will assist in pulling barges which may be attached to the same endless cable moving in the opposite direction, the movement of the endless cable being down stream on the one side of the power batteries, and up stream on the other side.

It will thus be seen that I have produced, in the float-flumes, attachments and equipment and combinations thereof, anchored *seriatim* in the current and segregated into series or power batteries by an endless encircling cable, the floats carrying feed wires which are continued across open water spaces to other power batteries similarly anchored, an apparatus for utilizing the force of water currents for generating electric or other power to be used for navigation or other purposes, and the force of the current acting on the endless cable may be utilized for towing barges and the like up stream and down stream.

Repetitions of the hereinbefore described power batteries, suitably anchored in the current throughout the navigable length of a river or of any desired portion thereof and connected electrically, using the force of the current to provide the power for propelling vessels up stream and down and for production of electric or other power for this and other uses, forms my system of harnessing the current and utilizing its force for navigating rivers and for other purposes. It may also be classed as a conserver of fuel.

I claim:

1. In an apparatus of the class described, an initial float, a terminal float and floats intermediate the initial and terminal floats, water motors carried by the floats, generators carried by the floats, means for actuating the generators by power derived from the water motors, storage batteries carried by the floats, conductors leading from the generators to the storage batteries, trolley wires carried by the floats and conductors leading from the storage batteries to the trolley wires.

2. In an apparatus of the class described, a series of batteries of floats, each of which batteries comprises an initial float, a terminal float and floats intermediate the initial and terminal floats, drums mounted upon the initial and terminal floats of each battery, cable-directing means carried by the intermediate floats, an endless cable embracing the drums and supported by directing means, trolley and feed wires carried by and connecting the series of batteries, water motors carried by the floats, electric generators carried by the floats arranged to be actuated by power derived from the water motors, storage batteries carried by the floats and conductors leading from the generators to the trolley and feed wires.

3. In an apparatus of the class described, a series of batteries of floats, the initial and the terminal floats of each battery being spaced apart to permit the passage of vessels between the several batteries, floats intermediate the initial and terminal floats of each battery, drums carried by the initial and terminal floats of each battery, cable-directing means carried by the floats, the power from which drums is imparted to the cable and means for positioning each float in a stream.

4. In an apparatus of the class described, a series of batteries of floats, the initial and the terminal floats of each battery being spaced apart to permit the passage of vessels between them, floats intermediate the initial and terminal floats of each battery, drums carried by the initial and terminal floats of each battery, cable-directing means carried by the floats, the power from which is imparted to the cable, means for positioning each float in the current of a stream, trolley and feed wires carried by the series of floats, storage batteries carried by each float, electric generators carried by each float and conductors leading from the generators to the storage batteries and from the storage batteries to the feed and trolley wires.

5. In an apparatus of the class described, a series of batteries of floats, the initial and terminal floats of each battery being spaced apart to permit the passage of vessels between the several batteries, means for positioning all of the floats within the channel of a stream, a water motor carried by each float, electric generators carried by each float, a storage battery carried by each float and suitably connected with the electric generators, cable-directing means carried by each float, an endless cable embracing each battery of floats, wires carried by the series of batteries of floats and electric conductors leading from the storage batteries to the wires.

6. In an apparatus for generating power by the utilization of the force of a water current, a series of any desired number of floats of reinforced concrete or other suitable construction, fixedly positioned in succession and anchored in the current *seriatim*, there being flumes formed by said floats, water motors suitably installed on the float-flumes to be actuated by the force of a water current, electric generating means supported by deck-platforms of the floats and suitably connected with said water motors, storage batteries carried by said deck-platforms and connected to the electric generating means, electric motors suitably connected to said storage batteries or generating means, drums operated by said electric motors and an endless cable passing around and actuated by said drums.

7. In an apparatus for generating power by utilizing the force of a current of water, a series of any desired number of floats constructed of reinforced concrete or other suitable construction, provided with air chambers, depending flanges and flaring openings, means for connecting and holding said floats in the current in succession to each other, water motors suitably installed in the flumes, power generating means supported by deck-platforms of the floats and suitably connected to said water motors, motors suitably connected to the power generating means, drums operated by said motors, an endless cable passing around said drums, and encircling and revolving about any desired number of floats, segregating them into a power battery, the endless cable arranged to tow barges attached thereto.

8. In an apparatus for generating power by utilizing the force of a current of water, a series of any desired number of floats, constructed of reinforced concrete, or other suitable construction, provided with air chambers, depending flanges and flaring openings, with means for connecting and holding said floats in the current in succession to each other, water motors suitably installed in the flumes, electric generating means supported by deck-platforms of the floats and suitably connected to said water motors, electric feed wires suspended from supports rising from said floats, electric motors suitably connected to the electric generating means, drums operated by said motors, an endless cable, passing around and actuated by drums, placed on the first and last anchored float of that series, encircling and revolving about any desired number of floats, suitably anchored in the current *seriatim*, segregating them into a series and forming a self-contained and automatically operative power battery, the endless cable arranged to tow barges attached thereto, feed wires, electrically connecting the various power batteries, arranged to allow passage of boats from side to side of the stream, electrically connecting all the power batteries throughout the system and enabling concentration of the aggregate energy of power batteries thus electrically connected, and providing means for the distribution and disposal of said aggregate energy as, and where, desired.

9. In an apparatus for generating power by utilizing the force of a current of water, a series of any desired number of floats, constructed of reinforced concrete, or other material, provided with air chambers, depending flanges and flaring openings, means for connecting and holding said floats positioned in parallel relation to each other, to form flumes, and anchored in the current in succession to each other, water motors suitably installed in the flumes, electric generating means supported by deck-platforms of the floats and suitably connected to said water motors, electric feed wires suspended from supports rising from said floats electrically connecting the floats with each other, electric motors suitably connected to the electric generating means, drums operated by said motors, an endless cable passing around and actuated by drums placed on the first and on the last float of each series, encircling and revolving about any desired number of floats suitably anchored in the current *seriatim*, segregating them into a series and forming a self-contained and automatically operative power battery, the electricity produced carried on feed wires which electrically connect the power batteries comprising the system, an endless cable arranged to tow vessels attached thereto, the feed wire arranged for the operation of vessels suitably equipped with trolleys or other appliances with which to connect with the electric wires, or to supply storage batteries on vessels equipped with independent propelling machinery; all uniting to form my system of navigating vessels and producing electric, or other power, by utilizing the force of the current of a stream, with resultant conservation of fuel.

In testimony whereof, I have signed my name to this specification, in presence of two subscribing witnesses.

THOMAS WARREN.

Witnesses:
J. W. ERHARD,
F. R. BROOKS.